(12) United States Patent
Hill

(10) Patent No.: US 6,829,037 B2
(45) Date of Patent: Dec. 7, 2004

(54) METHOD AND SYSTEM FOR VERIFYING A PHOTOFINISHING ORDER

(75) Inventor: David W. Hill, Walnut Creek, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/393,233

(22) Filed: Mar. 20, 2003

(65) Prior Publication Data

US 2004/0184016 A1 Sep. 23, 2004

(51) Int. Cl.$^7$ .................... G03B 27/52; G03B 27/32; G03B 29/00; G06F 17/60
(52) U.S. Cl. ................... 355/40; 355/77; 355/429; 705/26
(58) Field of Search .................... 355/18, 40, 77; 396/311, 429; 705/16, 17, 26, 27, 407, 414

(56) References Cited

U.S. PATENT DOCUMENTS

| | | | | |
|---|---|---|---|---|
| 6,017,157 A | * | 1/2000 | Garfinkle et al. | 396/639 |
| 6,324,521 B1 | * | 11/2001 | Shiota et al. | 705/27 |
| 2001/0021311 A1 | * | 9/2001 | Mizumo | 396/429 |
| 2001/0041072 A1 | * | 11/2001 | Takano | 396/429 |
| 2002/0067500 A1 | * | 6/2002 | Yokomizo et al. | 358/1.15 |
| 2003/0132298 A1 | * | 7/2003 | Swartz et al. | 235/472.02 |
| 2003/0182210 A1 | * | 9/2003 | Weitzman et al. | 705/27 |

* cited by examiner

*Primary Examiner*—Alan Mathews
(74) *Attorney, Agent, or Firm*—Frank Pincelli

(57) ABSTRACT

A system and method for verifying the validity of a customer order by a service provider. The service provider receives a photofinishing order for at least one photofinishing product. An estimated weight of the photofinishing order is determined based on the known average weight for each of the at least one photofinishing product and package that is containing the product and compared with the actual package containing the photofinishing order. The order is shipped if the difference between the actual weight and the estimated weight is within tolerance.

27 Claims, 2 Drawing Sheets

METHOD AND SYSTEM FOR VERIFYING A PHOTOFINISHING ORDER

FIELD OF THE INVENTION

The present invention relates to the delivery of image products, more particularly, to a method and system for an image provider to ship a variety of image products to many different customers in an accurate and efficient manner.

BACKGROUND OF THE INVENTION

With the advent of digital photofinishing, a wide variety of opportunities have opened for the customer in ordering various photofinishing products. Today, consumers may up-load digital images to a photofinishing image provider such as the Ofoto website (ofoto.com) where the customer is allowed to select individual images for printing in a variety of formats and/or associating a wide variety of different products with selected images. Thus, any particular order may comprise of a single print, multiple prints, or various other image products that are placed in a single package to be returned to the customer. With the great variety in composition of any order, there is an increased possibility that the image provider may ship an incomplete or wrong order to the customer. It is quite upsetting to a customer to receive an order that is incomplete or the wrong order. This typically involves the customer in having to inform the image provider of the error and waiting until the order is corrected. This is often quite upsetting to the customer. It is expensive for the service provider to manually check each order prior to sending the order out as it would add an excessive amount of cost to the goods.

Thus, there is a need to provide a cost effective method and system for minimizing the possibility of sending an incomplete or incorrect order to a customer.

SUMMARY OF THE INVENTION

In accordance with one aspect of the present invention there is provided a method for verifying the validity of a photofinishing order by a service provider, comprising the steps of:

service provider receiving a photofinishing order from a customer for at least one photofinishing product;

associating an order ID with respect to the photofinishing order producing the at least one photofinishing product for the photofinishing order;

assembling the photofinishing order and placing the order within a package, the package having the ID thereon in machine readable format;

weighing the package containing the photofinishing order so as to obtain an actual weight of the photofinishing order and comparing the actual weight with an estimated weight of the package containing the photofinishing order, the estimated weight being obtained by machine reading the order ID and accessing information using the order ID; and shipping the order to the customer if the difference between the actual weight and the estimated weight is within tolerance.

In accordance with another aspect of the present invention there is provided a system for verifying the validity of a photofinishing order by a service provider, comprising the steps of:

a computer system for receiving a photofinishing order from a customer for at least one photofinishing product, the computer system associating an order ID with respect to the photofinishing order;

an output device for producing the at least one photofinishing product in accordance with the photofinishing order;

an assembly station for assembling the photofinishing order and placing the order within a package, the package having the ID thereon in machine readable format;

a weigh station for weighing the package containing the photofinishing order so as to obtain an actual weight of the photofinishing order and comparing the actual weight with an estimated weight of the package containing the at least one photofinishing product using information obtained using the order ID; and shipping the order to the customer if the difference between the actual weight and the estimated weight is within tolerance.

In accordance with yet another aspect of the present invention there is provided a method for verifying the validity of a customer order, comprising the steps of:

receiving a photofinishing order comprising at least one photofinishing product;

calculating a total estimate weight of the photofinishing order based on the average known for each of the at least one photofinishing order and a package for containing the photofinishing order;

providing the at least one photofinishing product for the photofinishing order and placing it within the package;

weighing the package containing the photofinishing order so as to obtain an actual weight of the photofinishing order and comparing the actual weight with the total estimated weight;

shipping the order if the difference between the actual weight and the estimated weight is within tolerance.

In still another aspect of the present invention there is provided a system for verifying the validity of a customer order, comprising the steps of:

receiving a photofinishing order comprising at least one photofinishing product;

calculating a total estimate weight of the photofinishing order based on an average known weight for each of the at least one photofinishing product and a package for containing the photofinishing order;

providing the at least one photofinishing product for the photofinishing order and placing it within the package;

weighing the package containing the photofinishing order so as to obtain an actual weight of the photofinishing order and comparing the actual weight with the total estimated weight;

shipping the order if the difference between the actual weight and the estimated weight is within tolerance.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
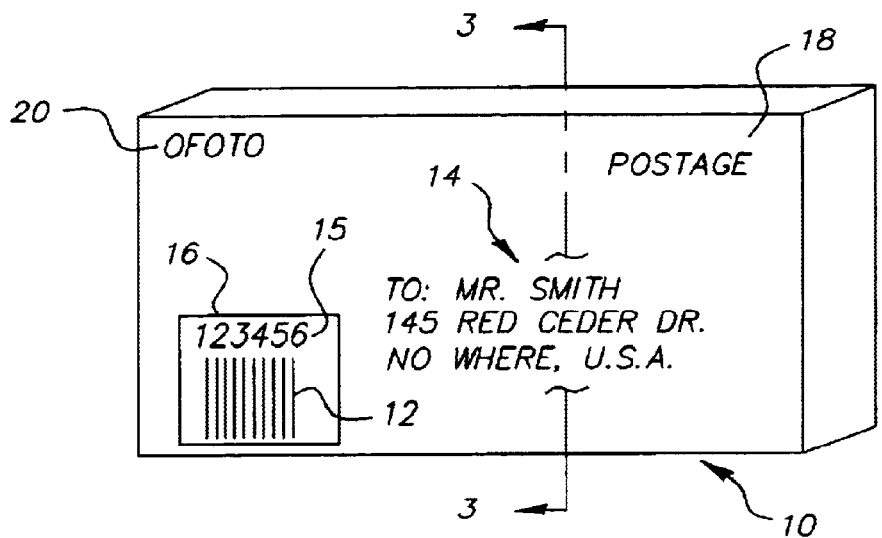
FIG. 1 illustrates a package for delivering of a photofinishing order in accordance with the present invention.
Figure 2:
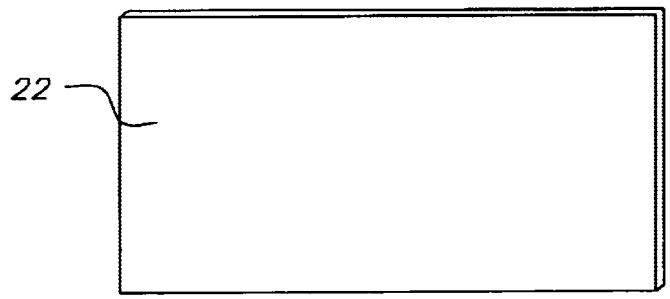
FIG. 2 is an illustration of a photographic print that may comprise part of the photofinishing order.
Figure 3:
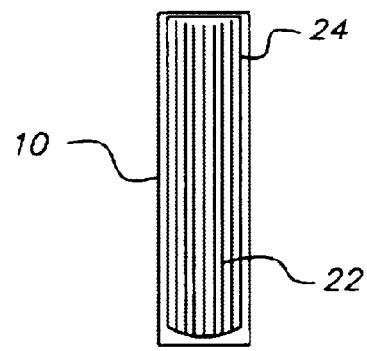
FIG. 3 is a cross-sectional view taken along the line 3—3 of FIG. 1 illustrating a plurality of individual photographic prints placed within a wallet that is provided within the shipping package.

Referring to FIGS. 1–3, there is illustrated a package 10 for shipping of a photofinishing order to customer that has been prepared by an image provider. In the particular embodiment illustrated the customer shipping address 14 is provided on the package. The package 10 also includes a machine readable unique order ID 12 that is associated with the customer. In the embodiment illustrate the ID 12 is in the form of a machine readable bar code. However, any appropriate machine readable code may be used. A human readable form 15 of the unique order ID 12 is provided as a backup in case the machine readable order ID become unreadable. In the particular embodiment illustrated the order ID has been printed on a label 16 that has been secured to package 10. However, it is to be understood that the unique order ID 12 may be printed directly on the package 10 if so desired. Placing the unique order ID 12 on a label, makes the assembly process easy and avoids the need of providing a specifically designed printer. The package 10 may have other information thereon, for example, appropriate postage 18 and shipper information 20.

A customer photofinishing order may comprise a single or multitude prints and/or variety of different type and type items. For example, a photofinishing order may comprise any number of photographic prints anywhere from 1 to hundreds. Additionally, the photographic prints may come in a variety of predetermined sizes. For example, but not limited to, 3×5; 4×6; 5×7; 8×10; 11×13; etc. In the embodiment illustrated in FIG. 3 seven (7) photographic prints 22 have been placed in a single wallet 24. In addition, various other image products may be shipped to the customer. For example, photographic frames, calendars, posters, etc. While many different products may be shipped to the customer, the known weight of all of these individual products i.e. prints, posters, frames, etc., have all predetermined average weights that can be determined and stored in a computer memory. The individual weights of each of these individual items, including the associated packing and shipping materials, are all fairly constant and vary only slightly. Thus, when a customer places an order with the photoservice provider, at that point in time, the estimated weight of the order to be shipped can be calculated in accordance with a predetermined criteria For example, if 24 photographic prints, each having a size of 4×6, are ordered, the average weight of each individual print is known, and the number of wallets necessary for packing of the prints therein are known in accordance with predetermined criteria The weight of each wallet, and the size and weight of the package needed for shipping of the items to be shipped to the customer is set forth by a predetermined criteria The particular criteria for shipping of any order will of course be dependent upon the goods ordered, the packaged needed to ship the order, and associated materials needed for shipping of the complete order. Knowing this information, an estimated shipping weight of the packaged order, can be calculated. This estimated weight can then be compared with the actual weight of the order to shipped. If the package containing the order has an actual weight that is within appropriate tolerances with the estimated weight, this provides at least one verification that the order is complete and may be shipped to the customer.

Figure 4:
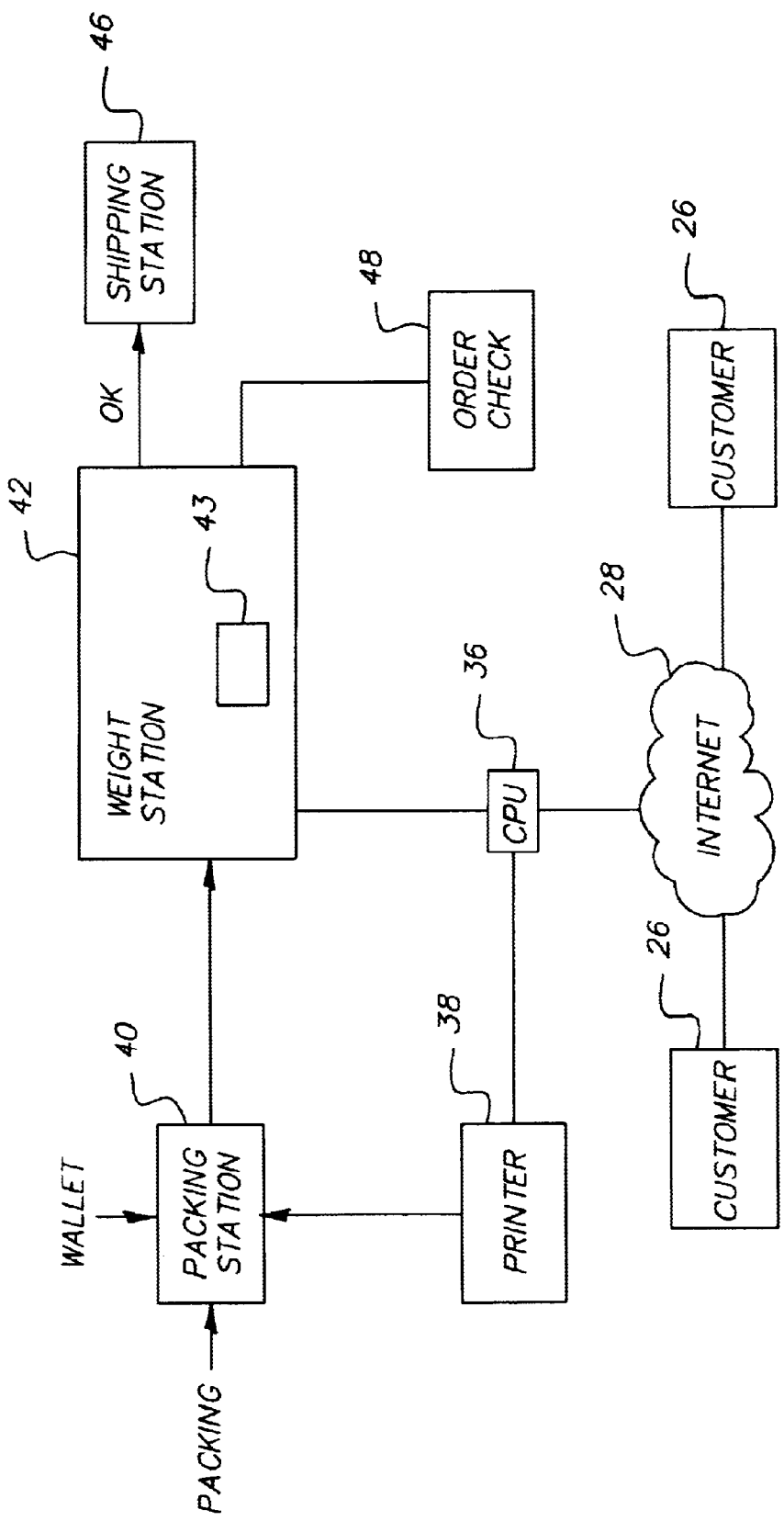
FIG. 4 illustrates a flow diagram of a system made for verifying and checking a photofinishing order prior to shipping.

In order to better understand the process, a brief description will be provided. Referring to FIG. 4, a system is illustrated for implementing the present invention. Initially, a customer 26, among a plurality of customers, will place an order with an image service provider, such as Ofoto website (ofoto.com). This may take a variety of forms, for example, over a communication network, such as the illustrated Internet 28, or by mail. It is to be understood that any appropriate communication network may be utilized for sending of the order to the service provider. In the embodiment illustrated, customer 26 either uploads an image to a computer system (CPU) 36 with associated storage capability and/or accesses their account where images have been previously stored. In any event, a photofinishing order is created by the customer for providing of selected image products. This information is stored into CPU 36 for processing and tracking of the customer order. Each customer order is associated with a unique order ID 12 by CPU 36. Knowing the make-up of the customer order, an estimated shipping weight of the package containing the ordered goods is calculated and stored. The appropriate image products are produced for example, if prints have been ordered, the customer order will be forwarded to an appropriate printing device 38, such as a digital mini-lab, wherein the appropriate number of prints are produced and associated with the order ID. The completed image products ordered are then forwarded to a packing station 40 wherein the image products package 10 that comprise the order are assembled. Any other ordered image products are also sent to the packing station 40 for assembly with the customer order. In the particular example illustrated, the ordered prints and wallet(s) or other materials to be provided, are assembled and placed in package 10.

The assembled package 10 is then forwarded to a weigh station 42 wherein the package 10 is weighed and this information is forwarded to the CPU 36. Just before the weigh station, or at the weigh station 42, the unique ID is read by an appropriate machine code reading device 43. For example, a bar code reader. The customer order ID is then associated by CPU 36 wherein the stored estimated weight of the package is compared with the actual weight as determined by the weigh station 42. If the actual weight is within tolerance of the estimated weight, it is sent to shipping station 46 or delivered to the customer. If there is a variation outside of the predetermined tolerances, the order is sent to a verification order check station 48 where the order is reviewed to determine if the order is complete or if the order has been incorrectly or incompletely assembled.

By comparing the actual weight with the estimated weight, a verification process can be quickly employed for determining if the appropriate number of items are in the package for shipping to the customer. Since, the customer order ID can be machine read and the package automatically weighed, the cost of verification can be done quickly and efficiently with a large number of customer orders each having custom components in those orders.

In the particular embodiment illustrated, the estimated weight is calculated and stored when the order is initially received, however, this calculation can take place at any time and need not be stored. For example the estimated weight can be calculated at the time the actual weight had been taken of the package or is about to be read.

In the embodiment illustrated, the actual weight is sent to the CPU 36, however, this may not be necessary as appropriate equipment at the weigh station may first read the order ID and retrieve the estimated weight from CPU 36, or alternatively calculate the estimated weight based on the information obtained from the CPU. The appropriate equipment at the weigh station will decide if the package weight is within tolerance.

In the embodiment illustrated, the customer order comprised of only one package 10. It is possible that a single customer order will result in the need for more than one package 10. In such case, each package would receive its own individual customer order ID and each of the order IDs would be associated with the customer. This information could then be used to assemble the entire order of the customer so that the complete order is sent to the customer at the same time. Alternatively, a note could be generated to be sent to the customer advising that the remaining part of the order will be shipped at a later date. This notice could also include the estimated date of shipment.

It is to be understood that various modifications and changes may be made without departing from the present invention, the present invention being defined by the following claims.

PARTS LIST 10 package
12 machine readable unique order ID
14 customer shipping address
15 human readable form
16 label
18 postage
20 shipper information
22 photographic prints
24 wallet
26 customer
32 weigh station
36 CPU
38 printing device
40 packing station
42 weigh station
43 machine code reader
46 shipping station
48 verification order check station

What is claimed is:

1. A method for verifying the validity of a photofinishing order by a service provider, comprising the steps of:
   said service provider receiving a photofinishing order from a customer for at least one photofinishing product;
   associating an order ID with respect to said photofinishing order
   producing said at least one photofinishing product for said photofinishing order;
   assembling said photofinishing order and placing said order within a package, said package having said ID thereon in machine readable format;
   weighing said package containing said photofinishing order so as to obtain an actual weight of said photofinishing order and comparing said actual weight with an estimated weight of said package containing said photofinishing order, said estimated weight being obtained by machine reading said order ID and accessing information using said order ID wherein said information comprises the weight of the package and said at least one photofinishing product that can be used to calculate said estimated weight; and
   shipping or delivering said order to said customer if the difference between said actual weight and said estimated weight is within tolerance.

2. A method according to claim 1 wherein said photofinishing products comprises a plurality of hard copy prints.

3. A method according to claim 2 wherein said photofinishing order further comprising associated material that is placed in said package.

4. A method according to claim 3 wherein said associated material comprises advertising material.

5. A method according to claim 3 wherein said association packing material comprises at least one wallet that is to be provided in association with a number of said plurality of hard copy prints.

6. A method according to claim 2 wherein said plurality of hard copy prints comprise at least two different sizes.

7. A method according to claim 1 wherein said at least one photofinishing product comprises a plurality of items that need to be shipped to said customer in more than one package, wherein each said packages has it's own associated order ID with respect to said customer.

8. A method according to claim 1 wherein said order ID is printed on a label placed on said package.

9. A method according to claim 1 wherein said information comprises an estimated weight determined by computer system that received said photofinishing order.

10. A method according to claim 9 wherein said information is stored in said computer system with respect to known weights of the at least one photofinishing product and package for containing said photofinishing product.

11. A method according to claim 10 wherein said estimated weight is determined at a weigh station that weighs said actual weight of said package and said at least one image product.

12. A method according to claim 1 wherein said information obtained from reading said order ID comprises the estimated weight stored on a computer system.

13. A method according to claim 1 wherein said photofinishing order is received over the internet.

14. A method according to claim 1 wherein said photofinishing products comprises frames and/or other associated image products.

15. A system for verifying the validity of a photofinishiag order by a service provider, comprising the steps of:
    a computer system for receiving a photofinishing order from a customer for at least one photofinishing product, said computer system associating an order ID with respect to said photofinishing order
    an output device for producing said at least one photofinishing product in accordance with said photofinishing order;
    an assembly station for assembling said photofinishing order and placing said order within a package, said package having said ID thereon in machine readable format;
    a weigh station for weighing said package containing said photofinishing order so as to obtain an actual weight of said photofinishing order and comparing said actual weight with said estimated weight of the package and said at least one photofinishing product that can be used to calculate said estimated weight; and
    shipping or delivering said order to said customer if the difference between said actual weight and said estimated weight is within tolerance.

16. A system according to claim 15 wherein said photofinishing products comprises a plurality of hard copy prints.

17. A system according to claim 16 wherein said photofinishing order further comprises associated material that is also placed in said package.

18. A system according to claim 17 wherein said associated material comprises additional packing material.

19. A system according to claim 18 wherein said additional packing material comprises advertising material.

20. A system according to claim 18 wherein said additional packing material comprises at least one wallet that is to be provided in association with the number of hard copy prints.

21. A system according to claim 16 wherein said plurality of hard copy prints comprise at least two different sizes.

22. A system according to claim 15 wherein said at least one photofinishing product comprises a plurality of items that need to be shipped to said customer in more than one package, wherein each of said packages has its own associated order ID with respect to said customer.

23. A system according to claim 15 wherein said order ID is printed on a label placed on said package.

24. A system according to claim 15 wherein said order ID on said package comprises a bar code.

25. A system according to claim 15 wherein said order is received over the internet.

26. A method for verifying thr validity of a photofinishing order by a service provider, comprising the steps of:

said service provider receiving a photofinishing order from a customer for at least one photofinishing product;

associating an order ID with respect to said photofinishing order for a plurality of hard copy prints;

producing said plurality of hard copy prints;

assembly said photofinishing order and placing said order within a package, said photofinishing order further comprising at least one wallet provided in said package for association with a number of said plurality of hard copy prints, said package having said ID thereon in machine readable format;

weighing said package containing said photofinishing order so as to obtain an actual weight of said photofinishing order and comparing said actual weight with an estimated weight of said package containing said photofinishing order, said estimated weight being obtained by machine reading said order ID and accessing information using said order ID; and shipping or delivering said order to said customer if the difference between said actual weight and said estimated weight is within tolerance.

27. A system for verifying the validity of a photofinishing order by a service provider, comprising the steps of:

a computer system for receiving a photofinishing order from a customer for a plurality of hard copy prints, said computer system associating an order ID with respect to said photofinishing order;

an output device for producing said plurality of hard copy prints in accordance with said photofinishing order;

an assembly station for assembly said photofinishing order and placing said order within a package, said package having said ID thereon in machine readable format an providing at least one wallet for holding a number of said plurality of hard copy prints;

a weigh station for weighing said package containing said photofinishing order so as to obtain an actual weight of said photofinishing order and comparing said actual weight with said actual weight with said estimated weight of said package containing said at least one photofinishing product using information obtained using said order ID; and shipping or delivering said order to said customer if the difference between said actual weight and said estimated weight is within tolerance.

* * * * *

UNITED STATES PATENT AND TRADEMARK OFFICE
CERTIFICATE OF CORRECTION

PATENT NO. : 6,829,037 B2
DATED : December 7, 2004
INVENTOR(S) : David W. Hill

It is certified that error appears in the above-identified patent and that said Letters Patent is hereby corrected as shown below:

Column 6,
Line 61, claim 15, 5$^{th}$ paragraph should read: -- a weigh station for weighing said package containing said photofinishing order so as to obtain an actual weight of said photofinishing order and comparing said actual weight with said estimated weight of said package containing said at least one photofinishing product using information obtained using said order ID wherein said information comprises the weight of the package and said at least one photofinishing product that can be used to calculate said estimated weight; and --

Column 7,
Line 27, "thr" should be replace with -- the --.

Column 8,
Line 21, "assembly" (second occurrence) should be replaced with -- assembling --.
Line 29, "with said actual weight" should be deleted.

Signed and Sealed this

Thirty-first Day of May, 2005

JON W. DUDAS
*Director of the United States Patent and Trademark Office*